UNITED STATES PATENT OFFICE.

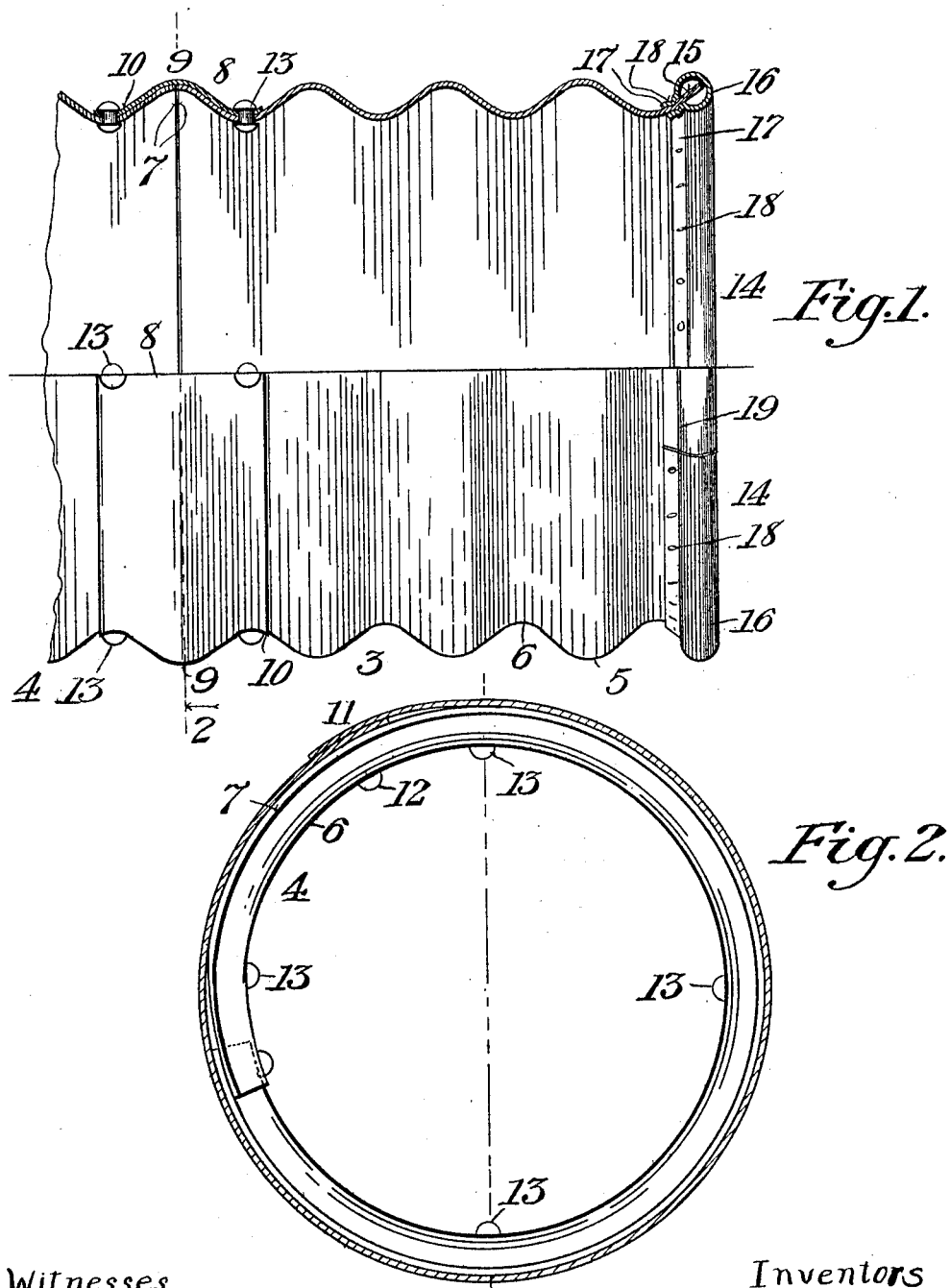

HERBERT S. PUTNEY AND FIRMAN L. CARSWELL, OF TOPEKA, KANSAS.

CULVERT-PIPE.

1,020,779.

Specification of Letters Patent.    Patented Mar. 19, 1912.

Application filed July 17, 1911. Serial No. 638,933.

*To all whom it may concern:*

Be it known that we, HERBERT S. PUTNEY and FIRMAN L. CARSWELL, citizens of the United States, residing at Topeka, in the county of Shawnee and State of Kansas, have invented certain new and useful Improvements in Culvert-Pipes, of which the following is a specification.

Our invention relates to the splicing of two or more sections of corrugated culvert pipe together, and to the ends of the culvert pipe.

The objects are to provide a rigid splice of two adjacent sections without diminishing the cross-sectional area of the pipe, especially to produce such a splice which is cheaply made and applied and which not only makes a rigid splice, but which is also strong and durable and which serves to reinforce the pipe; also to provide a protecting strip for the end of the pipe, which may be cheaply made and applied, and which is strong, simple, and durable, and which will prevent bending of the pipe end in handling, in transportation, and as well when the culvert pipe is in place. And our invention consists of the parts, improvements, and combinations herein set forth and claimed.

In the drawings accompanying and forming part of this specification, and in the description of the drawings, we have shown our invention in its preferred form, and have shown what we deem to be the best mode of applying the principles thereof; but it is to be understood that, within the scope of the appended claims, we contemplate changes in form, proportions, and materials, the transposition of parts, and the substitution of equivalent members, without departing from the spirit of our invention.

Figure 1 is an elevation view of a culvert pipe made in accordance with the principles of our invention, the upper half being a sectional elevation. Fig. 2 is a cross-section through the line 2 of Fig. 1.

Similar reference characters indicate like or corresponding parts throughout the two views.

The culvert pipe is shown as made in two sections 3 and 4 respectively, and corrugated, the ribs 5 and the valleys 6 extending transversely, that is, peripherally, of the pipe.

7 represents the abutting ends of the two adjacent sections, these ends being at the ribs, so that when the two ends are placed together they form a complete rib, or a continuation of the pipe.

8 is a splice for connecting the two ends together, comprising a band conforming in shape to the connecting rib and the next adjacent valleys, as indicated by the numerals 9, and 10, 10, respectively. The two ends of the band overlap, as indicated at 11, and are firmly secured together by means of the rivets 12 which also pass through the metal in the valleys of the pipe.

13, 13 represent a series of rivets securng the band to the respective sections and arranged around the pipe in each valley. Any suitable number of these rivets may be used. This method of splicing not only affords a rigid pipe, but it also does not diminish the cross-sectional area of the pipe, and it does reinforce the pipe.

14 is a protecting strip for the end of the pipe, embracing both sides and the end of the metal at the end of the pipe. Preferably the pipe terminates at a rib, as shown, and the protecting strip is secured on this outwardly flaring portion. Preferably, this strip is made substantially circular in cross section, as shown at 16, the edges 17, 17 lying flat against the culvert metal, and the strip is secured in place by means of a series of prick-punches 18, the outer edge of the pipe extending through the circular portion of the strip and abutting against the opposite side, as shown at 15. To apply the strip, we prefer to secure one end in place by means of a rivet 19, and then press on the remaining portion, and secure it with the prick-punches, as described. This protecting strip protects the end of the pipe from bending not only against careless handling in loading, unloading, transportation, etc., but also when in place, as against being bent from being driven against or over by wagons, etc. It is also to be noted that the culvert pipe is not materially added to in cost, as both the splice and the protecting strip can be made and applied very cheaply; yet the pipe is very materially improved in strength.

We claim:

1. The combination with a plurality of sections of corrugated iron culvert pipe, the ribs and valleys extending transversely of the length of the pipe, the adjacent ends of each section and the terminal end of the pipe ending at a rib; of a splice for securing adjacent sections together comprising a band corresponding in shape with the outer sides of adjacent ribs and the respective contiguous valleys, one of the ends of said band overlapping the other end, and a series of rivets securing said band to the respective sections in the respective valleys: and a protective covering for the end of the pipe comprising a band embracing both sides of said end and formed with a round bead covering the extreme end of the pipe.

2. The combination of two sections of corrugated iron culvert pipe, the ribs and valleys extending transversely of the length of the pipe, and the adjacent ends terminating at a rib and butting together, of a splice for securing said sections together comprising a band corresponding in shape with the outer sides of said butting ribs and the respective next adjacent valleys, one of the ends of said band overlapping the other, and a series of rivets passing through said band and the respective valleys.

3. The combination with the end portion of a corrugated iron culvert pipe whose ribs and valleys extend transversely of the length of the pipe, said end terminating with an outwardly flaring portion; of a protecting band therefor comprising a strip which is substantially circular in cross section and having edges which embrace opposite sides of the end, said end extending through the circular portion and abutting against the opposite side thereof, and said edges having a series of prick-punches extending into the pipe metal for securing it in place thereon.

4. The combination with an iron culvert pipe, of an end protecting strip embracing both sides and the end of the pipe metal and secured thereon by means of prick-punches.

5. The combination with an iron culvert pipe, of an end protecting strip embracing both sides and the end of the pipe metal.

In testimony whereof we have affixed our signatures in presence of two witnesses.

HERBERT S. PUTNEY.
FIRMAN L. CARSWELL.

Witnesses:
C. J. ROSEN,
J. M. STARK.

---

Copies of this patent may be obtained for five cents each, by addressing the "Commissioner of Patents, Washington, D. C."